United States Patent
Huang et al.

(10) Patent No.: US 9,966,996 B2
(45) Date of Patent: May 8, 2018

(54) POWER LINE COMMUNICATION ADAPTER CAPABLE OF BEING FREELY ASSEMBLED BY ACCESSORIES THEREOF

(71) Applicant: D-Link Corporation, Taipei (TW)

(72) Inventors: Jun-Hao Huang, Taipei (TW); Chih-Jung Jeng, Taipei (TW); Tsan-Sen Chen, Taipei (TW); Ming-Han Liu, Taipei (TW); Wei-Chung Hsu, Taipei (TW)

(73) Assignee: D-LINK CORPORATION, Taipei (TW)

( * ) Notice: Subject to any disclaimer, the term of this patent is extended or adjusted under 35 U.S.C. 154(b) by 549 days.

(21) Appl. No.: 14/296,709

(22) Filed: Jun. 5, 2014

(65) Prior Publication Data
US 2015/0124890 A1    May 7, 2015

(30) Foreign Application Priority Data
Nov. 7, 2013  (TW) .............................. 102140477 A

(51) Int. Cl.
*H04B 3/56*    (2006.01)

(52) U.S. Cl.
CPC ....... *H04B 3/56* (2013.01); *H04B 2203/5425* (2013.01); *H04B 2203/5454* (2013.01); *H04B 2203/5491* (2013.01)

(58) Field of Classification Search
CPC .... H04B 2203/5454; H04B 3/54; H04B 3/56; H04B 2203/5425; H04B 2203/5491
See application file for complete search history.

(56) References Cited

U.S. PATENT DOCUMENTS

| | | | | |
|---|---|---|---|---|
| 7,686,653 B2 * | 3/2010 | Binder | ................. | H01R 31/005 370/214 |
| 7,737,574 B2 * | 6/2010 | Yukizane | ................. | H04B 3/56 307/3 |
| 2010/0259097 A1 * | 10/2010 | Kim | ..................... | H01R 31/065 307/1 |
| 2013/0002409 A1 * | 1/2013 | Molina | ................. | H04B 3/542 340/12.32 |

* cited by examiner

*Primary Examiner* — Ryan Johnson
(74) *Attorney, Agent, or Firm* — Bacon & Thomas, PLLC

(57) ABSTRACT

The present invention is to provide a power line communication adapter capable of being freely assembled by accessories thereof, which includes an anti-noise device having a first male plug for receiving a power line communication signal from a power outlet, a first female socket for connecting the first male plug with an electrical equipment through a filter module, and a first adapting port connected to the first male plug, such that noise generated by the electrical equipment device can be filtered by the filter module without interfering the power line communication signal; and a power line communication device having a power line communication module along with a second adapting port connected thereto such that, when the first and second adapting ports are connected with each other, the power line communication device and the anti-noise device are combined into an anti-noise adapter for receiving and transmitting the power line communication signal.

1 Claim, 3 Drawing Sheets

POWER LINE COMMUNICATION ADAPTER CAPABLE OF BEING FREELY ASSEMBLED BY ACCESSORIES THEREOF

FIELD OF THE INVENTION

The present invention relates to a power adaptor, more particularly to a power line communication adapter, which can be freely assembled into different forms by using accessories thereof, so as to receive power line communication signal from a power outlet and filter noise generated by an electrical equipment device to avoid the noise from interfering the power line communication signal.

BACKGROUND OF THE INVENTION

In recent years, the Internet has become an influential, widespread message distribution center involved in the vigorous development of the rapid spread of information and electronic technology. According to the survey, all users using the Internet all over the world generate at least 100 billion Internet search records per month. Therefore, we can see the habit of people relying on the Internet. Since people need the assistance of the Internet to play online games, view advertising and marketing, plan tours, make medical appointments, and even check the bus schedule, how to enhance the convenience and the stability of the Internet in various environments has been one of the important topics for the related industry to resolve.

Generally, the spread of the network signals can be divided into "wire transmission" and "wireless transmission." The former connects a network device and a computer equipment to transmit the network signals through an Ethernet cable, and the latter is to make the network device send the network signal to the computer equipment wirelessly. However, the cable transmission is limited by the difficulty of laying Ethernet cable, and it is further problematic to completely cover the network signals in the same area. The wireless transmission is likely to be interfered by obstacles, which results in signal instability. Each of the two ways has its advantages and disadvantages, and is not perfectly available for all users.

In order to solve the problems involved in the difficulty of laying Ethernet cables and the interference of wireless Internet signals from obstacles, researchers developed a power line communication technology (PLC), which is a technology that utilizes the existing power lines in the buildings to transmit the network signals. When using the power line communication technology, users have to purchase a set of power line communication transmitters (eg: bridges) first and plug the transmitters into power outlets on different positions. Thereby, power lines can be utilized for the network signal transmission through the conversion of the network signals by each of the power line communication transmitters. Since the power line is a necessary line structure in each building, users therefore don't have to do much rewiring through using the power lines as their backbone for the transmission of network media. A lot of construction cost and time can be saved, and the interior decorated appearance of the building can then be completely retained. Therefore, this is a very ideal solution. However, power line communication technology has two main problems in practical applications, and hereby described as follows:

(1) Occupying sockets: General electrical outlets are set with two or more jacks. However, the spacings between these jacks are not wide enough and are much smaller than the configuration of power line transmission transmitter. As a result, it easily occupies the space of many jacks when the power line transmission transmitters are used. This causes the user unable to use the power line for power in the space. Although the user can use an extension cord or a power strip to avoid this problem, the majority of these devices on the market are set with electronic components, such as surge protectors, in order to enhance the security quality. This kind of electronic component would regard the network signals as surges and significantly reduce the signal strength of the network signals.

(2) Noise interference: Since the power line was originally intended only as a simple power supply medium and was not specifically designed for high quality transmission capacity, the voltage carried by the power line changes and even generates electromagnetic radiation along with the load of various electronic devices. Moreover, electronic devices are prone to generate noises when being powered. The network signals are imperceptibly interfered. Network signal transmission quality is reduced in mild cases, and completely destroyed in severe cases.

As to the first aforementioned problem, the industry has designed a power line communication device 1 with sockets as shown in FIG. 1. The power line communication device 1 is set with a male plug 11, a female socket 12 and a plurality of network ports 13, and a power line communication module is also set inside. When the male plug 11 is plugged into a power outlet, the power line communication device 1 can receive the power line communication signals from the power outlet and transmit the power line communication signals to other computer equipment, such as laptops, through the network ports 13. In addition, the user can still plug an electrical equipment, such as fans, chargers, etc., in the female socket 12 when the power line communication signals are transmitted at the same time. Thus, the jacks on the power outlet won't be occupied due to the need for receiving the power line communication signal.

In addition, as to the preceding second problem, some industries add an additional filter module in the power line communication device 1 as shown in FIG. 1 to filter out the noise generated by the electrical equipment so that the power line communication signals will not be disturbed. With respect to the two aforementioned ways, the problems can be perfectly solved. However, there is still a significant problem as far as the industry is concerned—because of taking the different needs of users into consideration, the industry need to separately design the power line communication device "with the filter module" or "without the filter module" when producing the power line communication device. In addition to adjusting the internal standard and the circuit configuration for different versions of the power line communication devices, the industry further needs to get different versions of the products certified. The industry's production costs are thereby significantly increased, and the development time is also significantly prolonged. For the industry, these are really disturbing dilemmas.

Therefore, how to improve the power line communication device to simplify costs and reduce time during the development and production process for this industry has become an important issue for the present invention to resolve.

SUMMARY OF THE INVENTION

Since the industry needs to design and process certifications for different types or versions of products, serious delays in production efficiency and increased design costs are results when producing the conventional power line communication devices. The inventor finally designed the present invention relating to a power line communication adapter capable of being freely assembled by accessories thereof, with years of practical experience, researching, testing and investigation, and hopes to solve many of the conventional problems.

The objective of the present invention is to provide a power line communication adapter capable of being freely assembled by accessories thereof, which includes an anti-noise device, a power line communication device and an external plug. The anti-noise device includes a first male plug, a filter module, a first female socket and a first adapting port, wherein the first male plug is plugged into a power outlet to receive a power line communication signal transmitted from the power outlet, the first female socket has one end plugged with an electrical equipment and the other end electrically connected to the first male plug through the filter module, and the first adapting port is electrically connected to the first male plug, such that noise generated by the electrical equipment device can be filtered by the filter module and that the power line communication signal is then avoided from being interfered by the noise. The power line communication device includes a second adapting port and a power line communication module, wherein the second adapting port is plugged into the first adapting port, and the power line communication module is electrically connected to the second adapting port. When the second adapting port and the first adapting port are electrically connected with each other, the power line communication device and the anti-noise device are combined into an anti-noise adapter (Passthrough PLC Adapter) to receive the power line communication signal transmitted from the anti-noise device through the power line communication module and to send out the power line communication signal, such as through wireless transmission or an Ethernet cable. The external plug has one end set with a third male plug and the other end set with a third adapting port, wherein the second adapting port and the third adapting port are electrically connected with each other, and the second adapting port is plugged into another power outlet through the third male plug when the power line communication device is not electrically connected to the anti-noise device. When the power line communication device and the external plug are combined into a PLC adapter, the received power line communication signal is sent out through the power line communication module through wireless transmission or an Ethernet cable. Therefore, the industry only has to design and process certification for the anti-noise device and the power line communication device when producing the power line communication adapter, and three different forms of products, such as anti-noise device (Noise Filter), anti-noise adapter (Passthrough PLC Adapter) and PLC Adapter, can be freely assembled by using the anti-noise device, the power line communication device and the external plug in different ways. Thereby, not only the flexibility and convenience in using the power line communication adapter for the users is enhanced, but also the design and certification costs for the industries during the production are also reduced.

In order to facilitate the examiner to have further knowledge and understanding of the present objectives of the present invention, technical features and the effects, the embodiments corresponding to drawings are illustrated as follows:

DESCRIPTION OF THE PREFERRED EMBODIMENT

Figure 1:
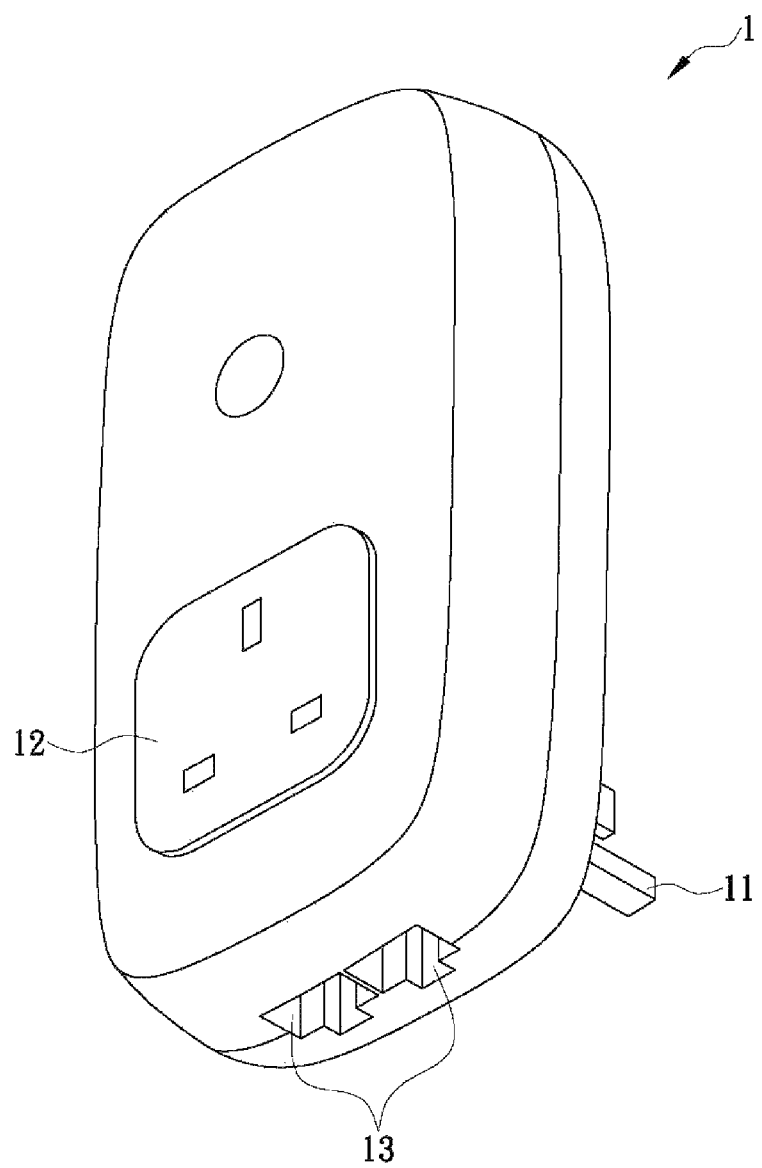
FIG. 1 is a schematic of a conventional power line communication device.

The present invention provides a power line communication adapter capable of being freely assembled into different forms by accessories thereof. Please refer to FIG. 2 and FIG. 3, which show the first preferred embodiment of the present invention. The power line communication adapter 2 includes an anti-noise device 21, a power line communication device 22 and an external plug 23. The exterior of the anti-noise device 21 is set with a first male plug 211, a first female socket 212 and a first adapting port 213. The interior of the anti-noise device 21 is set with a filter module 214. It should be noted that FIG. 2 is only a schematic of the present invention, and configurations and specifications of the first male plug 211 and the first adapting port 213 can be modified according to industry needs or electrical equipment standards of different countries and are not limited to the above description of the present invention.

Figure 2:
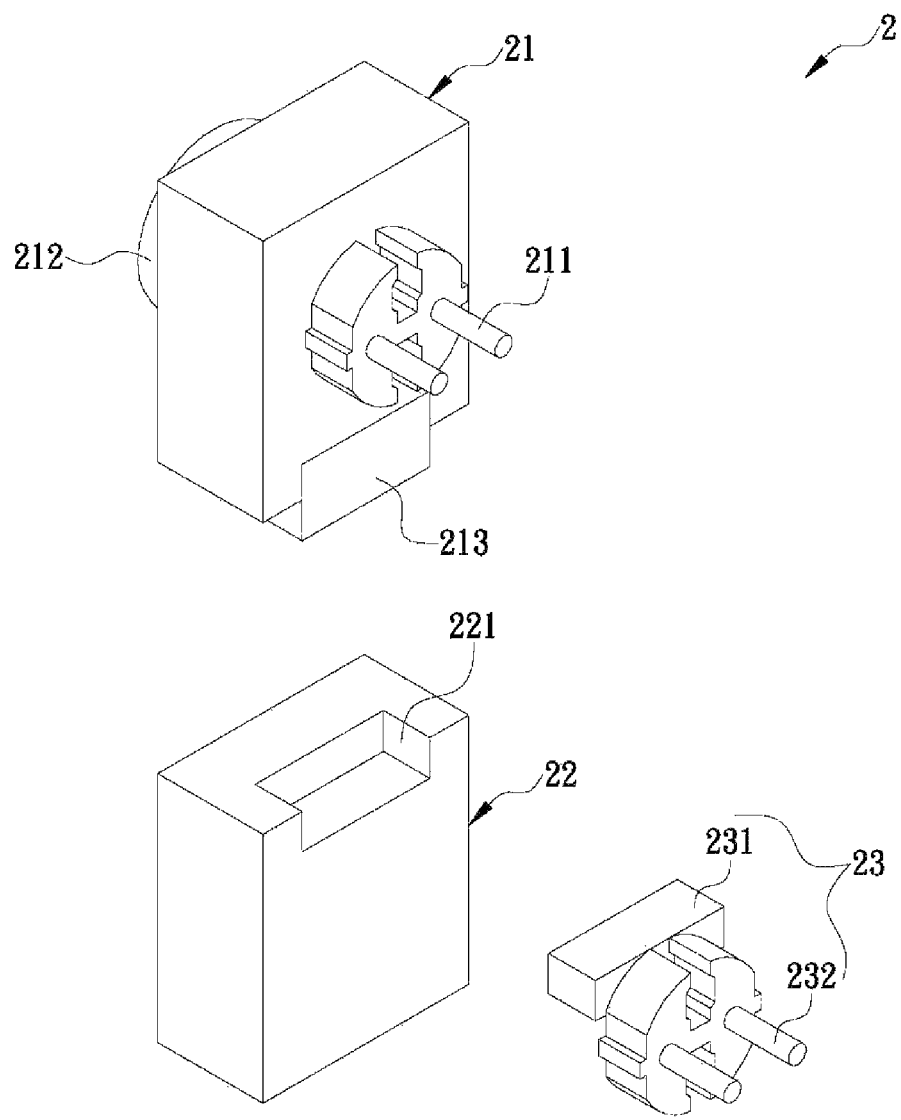
FIG. 2 is a structural schematic of a power line communication adapter of the present invention.
Figure 3:
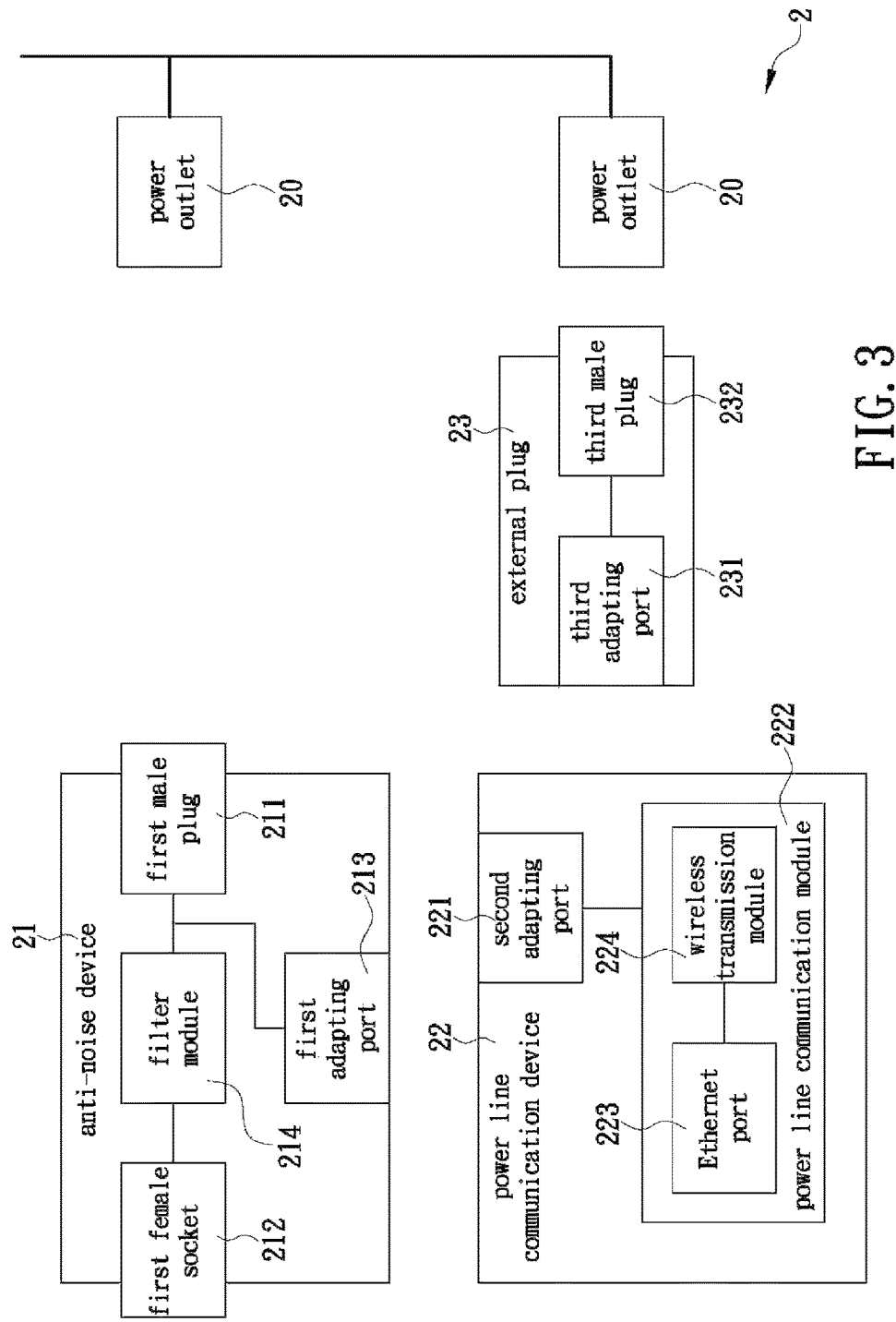
FIG. 3 is a schematic of a first preferred embodiment of a power line communication adapter of the present invention.

Refer to FIGS. 2 and 3, the power line communication adapter 2 is applied to a power system. The power system includes a plurality of power outlets 20, and can be electrically connected to a network device, such as routers and bridges etc. (not shown) for transmitting power line communication signals to those power outlets 20. A configuration and a specification of the first male plug 211 of the anti-noise device 21 matches the power outlet 20 and is able to be plugged into the power outlet 20 for receiving the power line communication signal transmitted from the power outlet 20. The first female socket 212 is electrically connected to the first male plug 211 through the filter module 214. When an electrical equipment, such as fans, charger or lamps, etc., is plugged into the first female socket 212, the electrical equipment can receive the electricity provided from the power outlet 20 through the anti-noise device 21. The noise generated when the electrical equipment is running will be filtered by the filter module 214 without interfering with the power line communication signal.

The first adapting port 213 is electrically connected to the first male plug 211 to receive the power line communication signal. The first adapting port 213 can be a USB interface connector, but can also be the transmission interface designed by the industry. The power line communication device 22 is set with a second adapting port 221 outside and a power line communication module 222 inside. A configuration and a specification of the second adapting port 221 matches the first adapting port 213 and can be electrically connected to the first adapting port 213. When the anti-noise device 21 and the power line communication device 22 are combined into an anti-noise adapter (Passthrough PLC Adapter), the anti-noise device 21 can send the power line communication signal to the power line communication device 22, and the power line communication module 222 can then send out the power line communication signal.

The external plug 23 includes a third adapting port 231 and a third male plug 232. A configuration and a specification of the third adapting port 231 matches the second adapting port 221 and is electrically connected to the third male plug 232. The third adapting port 231 and the second adapting port 221 can be electrically connected with each other and the third male plug 232 can be plugged into another power outlet 20 when the second adapting port 221 of the power line communication device 22 is not electrically connected to the first adapting port 213 of the anti-noise device 21. Thus, the anti-noise device 21 (Noise Filter) can be served as an independent component to filter out the noise of the electrical equipment. The power line communication device 22 and the external plug 23 can be combined into one as a PLC Adapter so that the power line communication device 22 can receive the power line communication signal through the external plug 23 and send out the power line communication signal accordingly.

Because the anti-noise device 21, the power line communication device 22 and the external plug 23 can be combined with each other in differents way to form different functional products. Therefore, the industry only needs to design and process certification of the anti-noise device 21 and the power line communication device 22, respectively, and three different products, such as the anti-noise device 21, the anti-noise adapter (Passthrough PLC Adapter) and the PLC Adapter, can be freely assembled when producing the power line communication adapter 2. In this way, the cost of design and certification are reduced. However, traditional practices still dictate the need to design and process certification for the three products, respectively. Meanwhile, the flexibility and convenience for users in using the product are also enhanced.

For example, the user can use the anti-noise device 21 independently in order to avoid noise interference of the electrical equipment to the power line communication signal, and the power line communication device 22 and the external plug 23 can be assembled into the PLC adapter to receive and transmit the power line communication signal from a location far from the electrical equipment. The user may also assemble the anti-noise device 21 and the power line communication device 22 into the anti-noise adapter (Passthrough PLC Adapter) so that the electrical equipment can still get electricity normally without letting the power line communication signal be affected by the noise interference of the electrical equipment while the power line communication signal is received unhindered.

Refer to FIG. 3, in this embodiment, the power line communication device 22 further has at least one Ethernet port 223 or a wireless transmission module 224. Both the Ethernet port 223 and the wireless transmission module 224 are electrically connected to the power line communication module 222. Therefore, the power line communication signal can be transmitted to a computer device through the Ethernet port 223 or sent out through the wireless transmission module 224 after the power line communication module 222 receives the power line communication signal.

While the invention herein disclosed has been described by means of specific embodiments, numerous modifications and variations could be made thereto by those skilled in the art without departing from the scope of the invention set forth in the claims.

What is claimed is:

1. A power line communication adapter capable of being freely assembled by accessories thereof, comprising:

an anti-noise device including a first male plug, a filter module, a first female socket and a first adapting port, wherein the first male plug is plugged into a power outlet to receive electrical power along with a power line communication signal transmitted from the power outlet, the filter module is electrically connected to the first male plug, the first female socket is electrically connected to the filter module and is plugged with an electrical equipment, and the first adapting port is electrically connected to the first male plug, such that noise generated by the electrical equipment device can be filtered out by the filter module;

a power line communication device including a second adapting port and a power line communication module, wherein a configuration or specification of the second adapting port matches the first adapting port and can be electrically connected to the first adapting port, the power line communication module is electrically connected to the second adapting port and includes at least one of an Ethernet port or a wireless transmission module, and when the second adapting port and the first adapting port are electrically connected with each other, the power line communication device and the anti-noise device are combined into one for receiving the power line communication signal from the anti-noise device and sending the power line communication signal out through the power line communication module; and an external plug having one end set with a third male plug and the other end set with a third adapting port, wherein the third male plug and the third adapting port are electrically connected with each other, and a configuration or specification of the third adapting port matches the second adapting port, such that the second adapting port and the third adapting port can be electrically connected with each other, and the third male plug can be plugged into another power outlet when the power line communication device is not electrically connected to the anti-noise device, and that the power line communication device and the external plug are combined into one and the received power line communication signal is sent out through the power line communication module, wherein the power line communication device is adapted to be respectively assembled to either the anti-noise device or the external plug by electrically connecting the second adapting port to either the first adapting port or the third adapting port.

\* \* \* \* \*